May 2, 1939.  H. J. RITTENHOUSE  2,156,871
RUBBER PRODUCT
Filed Oct. 30, 1936
Fig. 1.
Fig. 2.
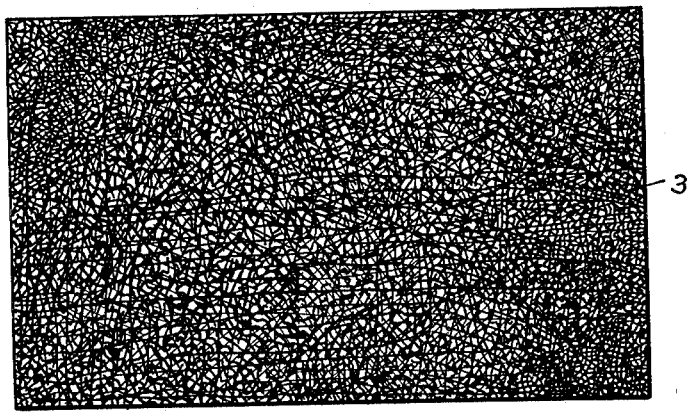
Fig. 3.
Inventor
Henry J. Rittenhouse,
By R. Cole Hirsch
Attorney Patented May 2, 1939

2,156,871

UNITED STATES PATENT OFFICE 2,156,871

RUBBER PRODUCT

Henry J. Rittenhouse, Philadelphia, Pa., assignor of one-half to Frederic H. Barth, Philadelphia, Pa.

Application October 30, 1936, Serial No. 108,369

1 Claim. (Cl. 154—46)

My invention is an improved rubber product having a friction surface resulting from the integral formation thereon of haphazardly arranged juxtaposed grains or granules of crystalline form and having facets of irregular size and shape forming sharp non-cutting edges.

My improved product is particularly designed for application to rollers or the like for gripping and moving sheet material, such as textiles, and my improved product effectively prevents slippage while avoiding abrasion or damage to the materials treated. My improved product is, however, adapted for many other uses where a high friction facing is desirable and for all of said purposes provides a longer life, fewer replacements and low maintenance cost and avoids all possibility of damage to the product being treated.

The characteristic features and advantages of my invention will further appear from the following description and the accompanying drawing illustrating graphically an improvement of my invention.

In the drawing, Fig. 1 is a top plan view of a small section of soft sheet rubber embodying my improvements, the granular surface thereof being somewhat enlarged for the sake of clearness; Fig. 2 is a transverse sectional view of the product shown in Fig. 1, greatly magnified; and Fig. 3 is a fragmentary top plan view of a portion of the product shown in Fig. 1, greatly magnified.

In the form of the invention illustrated in the drawing, a thin sheet 1 of soft rubber has a fabric backing 2 and a granular friction face 3 composed of haphazardly arranged granules 4 of crystalline form. These granules have facets 5 of irregular size and shape which come together to form on each granule sharp edges and points. The bases of the granules are integral with the body of the rubber sheet and are perfectly so juxtaposed that the projecting portions of one granule may have facets 6 thereof extending over or between the facets 7 of projecting portions of adjacent granules. The sharpness of the edges and points of the granules and the irregularity of their disposition causes them to securely hold anything adapted to be moved across the surface of the sheet but the softness of the rubber prevents any abrasion or damage to the material gripped. The interstices between the granules form air pockets and when air is expelled therefrom by pressure on the granules there results more or less suction effect supplementing the adhesive friction of the edges and facets of the surface.

In making the article, the sheet is placed, while the rubber thereon is in the soft state, against a suitable matrix surface and, when separated therefrom has the roughened surface as shown and described. By referring to Figs. 2 and 3, it will be seen that the majority of the granules have straight sides and meeting edges. This results in the provision of a mass of soft rubber, angular granules extending heterogeneously in many directions with the facets of some of the granules projecting between or over the facets of other of said granules, as previously set forth.

Having described my invention, I claim—

As an article of manufacture, a homogeneous body comprising a backing and an operative gripping surface of granular formation comprising a mass of closely related, soft rubber granules of such formation as to provide a multiplicity of facets of varying heights and shapes, with relatively sharp and elongated edges between the facets of at least a large proportion of the granules, the said granules extending heterogeneously in a multitude of angular dispositions with respect to each other to thereby cause the facets of some of the granules to extend over and between the facets of other of the granules and to dispose the sharp edges between the facets of the several granules at a large number of varying angles, the backing and the granules being integrally composed of a web of soft rubber, the edges between the facets of the granules being sharp enough to grippingly engage objects contacted thereby but soft enough to prevent injury to the said objects.

HENRY J. RITTENHOUSE.